(12) United States Patent
Iyer et al.

(10) Patent No.: US 7,756,126 B2
(45) Date of Patent: Jul. 13, 2010

(54) VLAN MOBILITY

(75) Inventors: Pradeep Iyer, Cupertino, CA (US);
John Richard Taylor, Tiburon, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 782 days.

(21) Appl. No.: 11/241,480

(22) Filed: Sep. 30, 2005

(65) Prior Publication Data

US 2007/0076694 A1 Apr. 5, 2007

(51) Int. Cl.
*H04L 12/54* (2006.01)
(52) U.S. Cl. .................. 370/389; 370/392; 370/401
(58) Field of Classification Search .......... 370/338, 370/389–390, 395.53, 401–402, 392, 400, 370/432; 709/223, 224, 245
See application file for complete search history.

(56) References Cited

U.S. PATENT DOCUMENTS

| | | | | |
|---|---|---|---|---|
| 5,892,912 | A * | 4/1999 | Suzuki et al. | 370/395.53 |
| 6,104,696 | A * | 8/2000 | Kadambi et al. | 370/218 |
| 6,563,832 | B1 * | 5/2003 | Stuart et al. | 370/403 |
| 6,643,261 | B2 * | 11/2003 | Kadambi et al. | 370/235.1 |
| 6,987,729 | B1 | 1/2006 | Gopalakrishnan et al. | |
| 7,095,738 | B1 * | 8/2006 | Desanti | 370/389 |
| 7,324,543 | B2 | 1/2008 | Wassew et al. | |
| 7,397,775 | B2 | 7/2008 | Womack et al. | |
| 2003/0035398 | A1 * | 2/2003 | Sato | 370/338 |
| 2003/0134642 | A1 | 7/2003 | Kostic et al. | |
| 2004/0053624 | A1 | 3/2004 | Frank et al. | |

OTHER PUBLICATIONS

U.S. Appl. No. 11/635,846, Non-Final Office Action, mailed Dec. 21, 2009.
U.S. Appl. No. 11/635,846, Final Rejection, mailed Jun. 19, 2009.
U.S. Appl. No. 11/635,846, Non-Final Office Action, mailed Feb. 25, 2009.

* cited by examiner

*Primary Examiner*—Pankaj Kumar
*Assistant Examiner*—Duc T Duong
(74) *Attorney, Agent, or Firm*—Blakely, Sokoloff, Taylor & Zafman LLP

(57) ABSTRACT

According to one embodiment of the invention, a method for providing VLAN mobility that comprises at least two operations. A first operation involves determining whether a unique identifier of the second network device is within an Association listing. The Association listing includes unique identifiers of networks devices associated with the first network device and virtual local area network (VLAN) identifiers for the network devices associated with the first network device. A second operation involves determining if the unique identifier of the second network device is within a Bridge listing if the unique identifier of the second network device is not located within the Association listing.

19 Claims, 7 Drawing Sheets

| STA MAC ADDRESS | BSSID (AP) | VLAN IDENTIFIER |
|---|---|---|
| MAC ADDRESS OF STA $150_1$ | BSSID OF AP $130_1$ | VLAN ID (X021) |
| MAC ADDRESS OF STA $150_2$ | BSSID OF AP $130_1$ | VLAN ID (X021) |
| MAC ADDRESS OF STA $150_3$ | BSSID OF AP $130_1$ | VLAN ID (X021) |
| MAC ADDRESS OF STA $150_4$ | BSSID OF AP $130_2$ | VLAN ID (X021) |

$230_1$

| STA MAC ADDRESS | BSSID (AP) | VLAN IDENTIFIER |
|---|---|---|
| MAC ADDRESS OF STA $150_5$ | BSSID OF AP $130_3$ | VLAN ID (X022) |
| | | |
| | | |
| | | |

$230_2$

| STA MAC ADDRESS | BSSID (AP) | VLAN IDENTIFIER |
|---|---|---|
| | | |
| | | |
| | | |

$230_3$

VLAN MOBILITY

FIELD

Embodiments of the invention relate to the field of communications, and in particular, to a system and apparatus for maintaining virtual local area network (VLAN) grouping for roaming network devices.

GENERAL BACKGROUND

Over the last decade or so, companies have installed enterprise networks with one or more local area networks in order to allow their employees access to various network resources. To improve efficiency, enhancements have been added to local area networks such as wireless access. Based on this enhancement, wireless local area networks (WLANs) have been and continue to be utilized by more and m ore companies.

Typically, a WLAN supports communications between wireless stations (STAs) and Access Points (APs). In general, each AP operates as a relay station by supporting communications with other network devices, such as wireless stations and other APs being part of a wireless network, as well as with resources on a wired network.

Currently, sub-networks (referred to as "subnets") are created in order to direct broadcast and multicast transmissions from an AP to smaller groups of wireless stations. One well-established network configuration used by WLAN is referred to as "/24," where approximately 250 network devices can be grouped as part of the same virtual local area network (VLAN). In general, a "VLAN" is a logical subgroup within a local area network (e.g., WLAN) that is created via software rather than manually moving cables in the wiring closet. VLANs combine network devices, such as a plurality of wireless stations (STAs) for example, into a single collective group regardless of their physical LAN connectivity.

Normally, STAs are assigned to certain VLANs based on their association with a particular AP. While this may be acceptable for a wired network where the stations are stationary, it is unacceptable for wireless stations that are adapted to roam (i.e., change their physical location). Currently, when a wireless station roams and establishes communications with another AP, it may be required to establish a new Internet Protocol (IP) address, especially if the new AP would be part of a different IP subnet. In addition, based on this new association, the wireless station may be assigned to a different VLAN. These operations cause network inefficiencies and may be disruptive to the operations of the wireless station.

While there are techniques for a station to maintain its IP address, normally through the establishment of an IP-to-IP tunnel between network switches in communication with the different IP subnets, this technique requires special protocols and complicates the overall network architecture.

BRIEF DESCRIPTION OF THE DRAWINGS

The invention may best be understood by referring to the following description and accompanying drawings that are used to illustrate embodiments of the invention.

DETAILED DESCRIPTION

Figure 1:
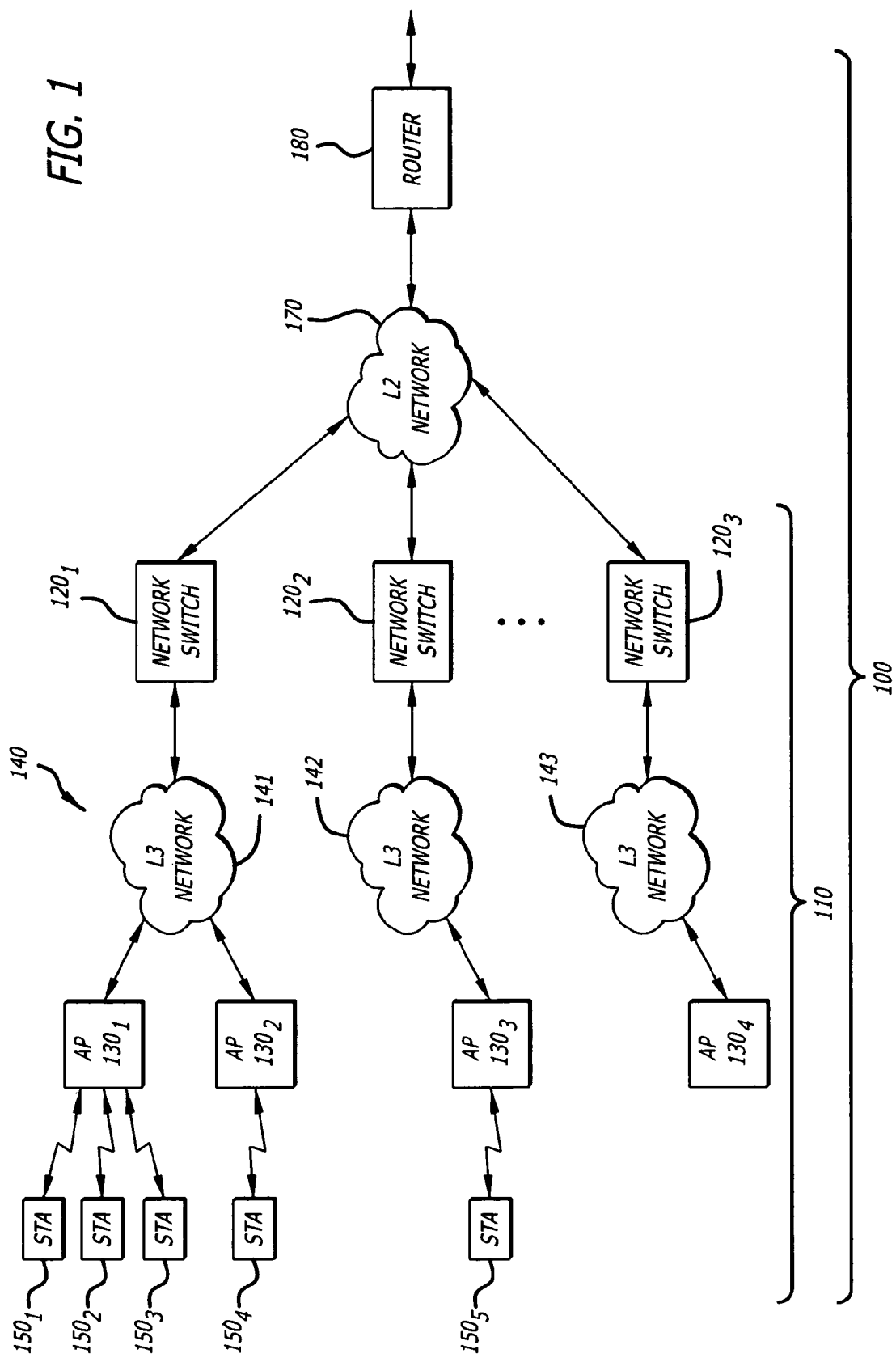
FIG. 1 is an exemplary embodiment of a network including network switches operating in accordance with an embodiment of the invention.

Embodiments of the invention relate to a system and apparatus for supporting and maintaining virtual local area networks (VLAN) without tunneling or other special communication protocols. According to one embodiment of the invention, a network switch is adapted with memory for storage of an Association listing and a Bridge listing. The "Association listing" is a collection of media access control (MAC) addresses of stations that are in communication with the network switch over an Access Point (AP) and their corresponding VLAN. The "Bridge listing" is a collection of the MAC addresses for all stations and their corresponding VLANs for the network. The size and aging of the Bridge listing is configured to provide infrequent overwriting of its entries.

Herein, according to one embodiment, the invention may be applicable to a network adapted with a wireless network such as a wireless local area network (WLAN) or wireless personal area network (WPAN). The wireless network may be configured in accordance with any current or future wireless communication protocols. Examples of various types of wireless communication protocols include, but are not limited or restricted to the following: Institute of Electrical and Electronics Engineers (IEEE) 802.11 standards, High Performance Radio Local Area Networks (HiperLAN) standards, WiMax (IEEE 802.16) and the like. For instance, the IEEE 802.11 standard may an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999); an IEEE 802.11a standard entitled "Wireless LAN Medium Access Control (MAC) and Physical Layer (PHY) specifications: High-Speed Physical Layer in the 5 GHz Band" (IEEE 802.11a, 1999); a revised IEEE 802.11 standard "Wireless LAN Medium Access Control (MAC) and Physical Layer (PHY) specifications" (IEEE 802.11, 1999); an IEEE 802.11g standard entitled. "Wireless LAN Medium Access Control (MAC) and Physical Layer (PHY) specifications: Further Higher Data Rate Extension in the 2.4 GHz Band" (IEEE 802.11g, 2003) or the like.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, the terms "logic" and "unit" are generally defined as hardware and/or at least one software module that is configured to perform one or more operations. For instance, processing logic may include a processor, a programmable gate array, combinatorial logic, a controller, or the like. A software module is executable code such as an application, an applet, a routine or even one or more executable instructions. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a tape, a Universal Serial Bus "USB" flash drive), or the like.

An "interconnect" is generally defined as a communication pathway established over an information-carrying medium. The interconnect may be a wired interconnect, where the medium is a physical medium (e.g., electrical wire, optical fiber, cable, bus traces, etc.), a wireless interconnect (e.g., air in combination with wireless signaling technology) or a combination of these technologies.

"Information" is defined as data, address, control or any combination thereof. For transmission, information may be transmitted as a message, namely a collection of bits in a predetermined format. One type of message, namely a wireless message, includes a header and payload data having a predetermined number of bits of information. The wireless message may be placed in a packet, frame or cell format. A "listing" is a collection of information that is used to identify relationships between such information. For instance, a listing may be a table that provides mapping between source MAC addresses and VLAN identifier.

I. General Network Architecture

Referring to FIG. 1, an exemplary embodiment of a network 100 including network switches operating in accordance with an embodiment of the invention is shown. In accordance with this embodiment of the invention, network 100 includes a local area network 110 adapted with an enhancement that allows wireless access, thereby operating as wireless local area network (WLAN) 110.

As shown in detail, WLAN 110 comprises one or more network switches $120_1$-$120_N$ (N≧1), such as WLAN ETHERNET™ switch(es) for example, in communication with one or more access points (APs) $130_1$-$130_m$ (where M≧1, M=4 for this embodiment) over an interconnect 140. According to one embodiment, interconnect 140 may be one or more sub-networks (subnets) forming an Open System Interconnection (OSI) Layer 3 (L3) network. Examples of these subnets include an Internet Protocol (IP) subnets 141-143. In general, interconnect 140 comprises wired and/or wireless information-carrying medium that provides a communication path between APs $130_1$-$130_M$ and network switches $120_1$-$120_N$.

In addition, one or more wireless stations, identified as STA $150_1$-$150_p$ (where P≧1, P=5 for this embodiment), are in communication with APs $130_1$-$130_M$ over wireless interconnect 160. According to one embodiment, a STA is implemented as any wireless device that processes information (e.g., computer, personal digital assistant "PDA", wireless telephone, alphanumeric pager, etc.). According to one embodiment of the invention, although not shown in detail, the STA may comprise a removable, wireless network interface card (NIC) that is separate from or employed within the STA. Normally, the NIC comprises a wireless transceiver, although it is contemplated that the NIC may feature only receive (RX) or transmit (TX) functionality such that only a receiver or transmitter is implemented.

More specifically, for this embodiment of the invention, each AP $130_1$, $130_2$, $130_3$ or $130_4$ supports bi-directional communications by receiving wireless messages from STAs $150_1$-$150_p$ within its coverage area and transferring information extracted from the wireless messages over interconnect 140 to which network switches $120_1$-$120_N$ are coupled. Hence, STAs $150_1$-$150_p$ are adapted to communicate with and provide information to any associated AP $130_{1,\ldots}$ or $130_M$.

For instance, as shown as an illustrative embodiment of a network configuration, STAs $150_1$-$150_3$ may be associated with AP $130_1$, and communicates over the air in accordance with a selected wireless communications protocol. Hence, AP $130_1$, generally operates as a transparent bridge connecting together a wireless and wired network. Similarly, STA $150_4$ may be associated with AP $130_2$ and STA $150_5$ may be associated with AP $130_3$.

Herein, each STA is assigned to a particular VLAN supported by WLAN 110 in order to establish broadcast/multicast domains. This VLAN assignment may be established through any number of mechanisms, including those that assign STAs to VLANs independent of their physical location. One assignment mechanism is based on the STA MAC address and the size of the VLAN pool, which is referred to as "VLAN Pooling" and is described below.

Each network switch $120_{1,\ldots}$ $120_N$ comprises logic that supports bi-directional communications with assigned APs $130_1$-$130_m$ over interconnect 140. Namely, network switches $120_1$-$120_N$ receives messages from and transmits messages to one or more targeted APs $130_{1,\ldots}$ or $130_m$ over interconnect 140. As an example, upon receiving a wireless message, an AP (e.g., AP $130_1$) extracts information and places such information into one or more IP packets for transmission to one of network switches $120_1$-$120_N$. As shown, network switch $120_1$, terminates APs $130_1$, and $130_2$, while network switches $120_2$ and $120_3$ terminate APs $130_3$ and $130_4$, respectively.

Referring still to FIG. 1, network switches $120_1$-$120_N$ are in communication with an OSI Layer 2 (L2) network 170. L2 network 170 enables communications between network switches $120_1$-$120_N$. L2 network 170 is further in communication with a router 180 that enables ends users on a private network (not shown) to communication with wireless stations $150_1$-$150_p$ within WLAN 110.

II. General Configuration of Network Switch and Listings

Figures 2, 3B:
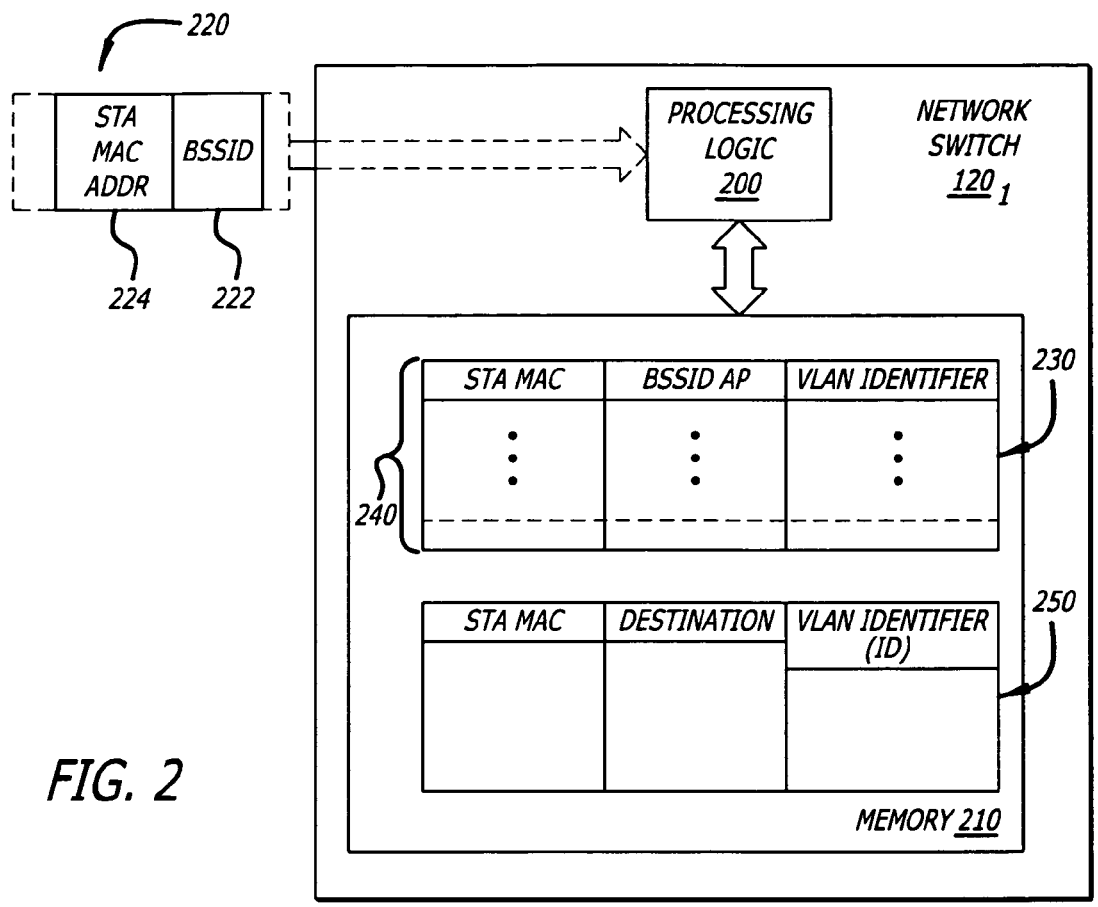
FIG. 2 is an exemplary embodiment of one of the network switches illustrated in FIG. 1.
FIG. 3B is an exemplary embodiment of the format of a Bridge listing supported by the network switches of FIG. 1.

Referring now to FIG. 2, an exemplary embodiment of a network switch (e.g., network switch $120_1$) illustrated in FIG. 1 is shown. It is contemplated, however, that each of network switch may be implemented with the same configuration described below.

Herein, network switch $120_1$, comprises processing logic 200 and memory 210. In response to receipt of an Association Request by AP $130_1$, of FIG. 1 for this illustrative example, information from the Association Request is placed into a message 220 and routed to network switch $120_1$. Such information includes a Basic Service Set Identifier (BSSID) 222 of AP $130_1$, and a media access control (MAC) address of a station (e.g. STA $150_1$) initiating the Association Request (hereinafter referred to as the "STA MAC address" 224).

Processing logic 200 extracts at least STA MAC address 224 and determines if STA MAC address 224 has been previously stored within an Association listing 230 stored in memory 210. According to this embodiment of the invention, Association listing 230 is a table including a plurality of entries 240. Each entry includes at least (1) STA MAC address 242 for a station that has associated-with APs terminated by network switch $120_1$ (e.g., AP $130_1$ or AP $130_2$ of FIG. 1), and (2) a VLAN identifier 244 that identifies the VLAN to which the station is assigned.

Figure 3A:
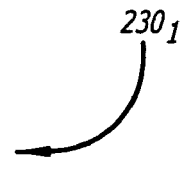
FIG. 3A is an exemplary embodiment of the format of Association listings supported by the network switches of FIG. 1.
Figure 3A:
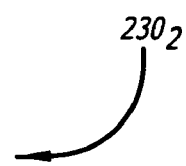
Figure 3A:
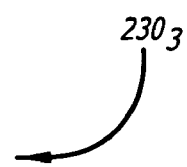

For a network where STAs $150_1$-$150_3$, $150_4$ and $150_5$ are associated with APs $130_1$, $130_2$ and $130_3$ respectively, Association listings 230 for network switches $120_1$-$120_3$, which are identified herein as Association listings $230_1$-$230_3$, would have the format shown in FIG. 3A.

Referring back to FIG. 2, where processing logic 200 determines that extracted STA MAC address 224 has not been previously stored within Association listing 230, processing logic 200 inserts STA MAC address 224 into a selected entry of Association listing 230 and assigns a VLAN ID 226 to STA $150_1$. As shown in FIG. 3B, STA $150_1$ is assigned to VLAN ID 226 represented as x021.

In addition, as shown in FIG. 3B, STA MAC address 224 and VLAN ID 226 are loaded into an entry of Bridge listing 250 stored in memory 210 of network switch $120_1$. Bridge listing 250 is a table that is populated with information from Bridge listings stored within other network devices in order to maintain a table of the MAC addresses for all stations associated within WLAN 110 of FIG. 1 as well as their corresponding VLAN IDs. As shown, STA MAC address 224 and VLAN ID 226 are further populated into Bridge listings stored in memory associated with other network devices (e.g., network devices $120_2$ and $120_3$). Hence, these Bridge listings would contain the same information as Bridge listing 250. As shown, the content within the destination fields is represented by the label "XXX" since these values are not pertinent to the discussion of the invention.

It is noted that an entry of Bridge listing 250 is created when network switch $120_1$, receives a frame from the STA $150_1$. If this frame is going to a broadcast/multicast address (e.g., an Address Resolution Protocol "ARP" Request), other networks switches need to also "see" the frame. As a result, a unique identifier of STA such as STA MAC address 224, and its corresponding VLAN ID 226 are loaded into entries of Bridge listings for network switches $120_2$ and $120_3$ based on communications supported by L2 network 170 of FIG. 1.

As a result, each network switch includes a first listing of STA MAC addresses and VLAN IDs corresponding to those STAs that are in communication with APs terminated by the network switch, and a second listing that includes the MAC addresses for all stations associated within APs within the WLAN. While the network switches may be responsible for loading and updating of these listings, it is contemplated that a management server may be used to control such operations.

With respect to aging of Association listing 230 and Bridge listing 250, it is contemplated that entries within Association listing 230 are aged out (e.g., available to be overwritten) when the STA associated with the entry disassociates from an AP terminated by the network switch. For instance, an entry associated with STA $150_1$, is aged out when STA $150_1$ disassociated from APs $130_1$ and $130_2$. In contrast, entries within Bridge listing 250 are aged out substantially slower than the age-out time for Association listing 230. For instance, Bridge listing 250 may be configured with to store approximately 64K entries. Hence, Bridge listing 250 will include entries, and in essence maintain the original VLAN assignments for a STA for a long duration and perhaps even indefinitely for smaller-scale networks.

III. Illustrating Embodiment of Listing Formations

Figure 4:
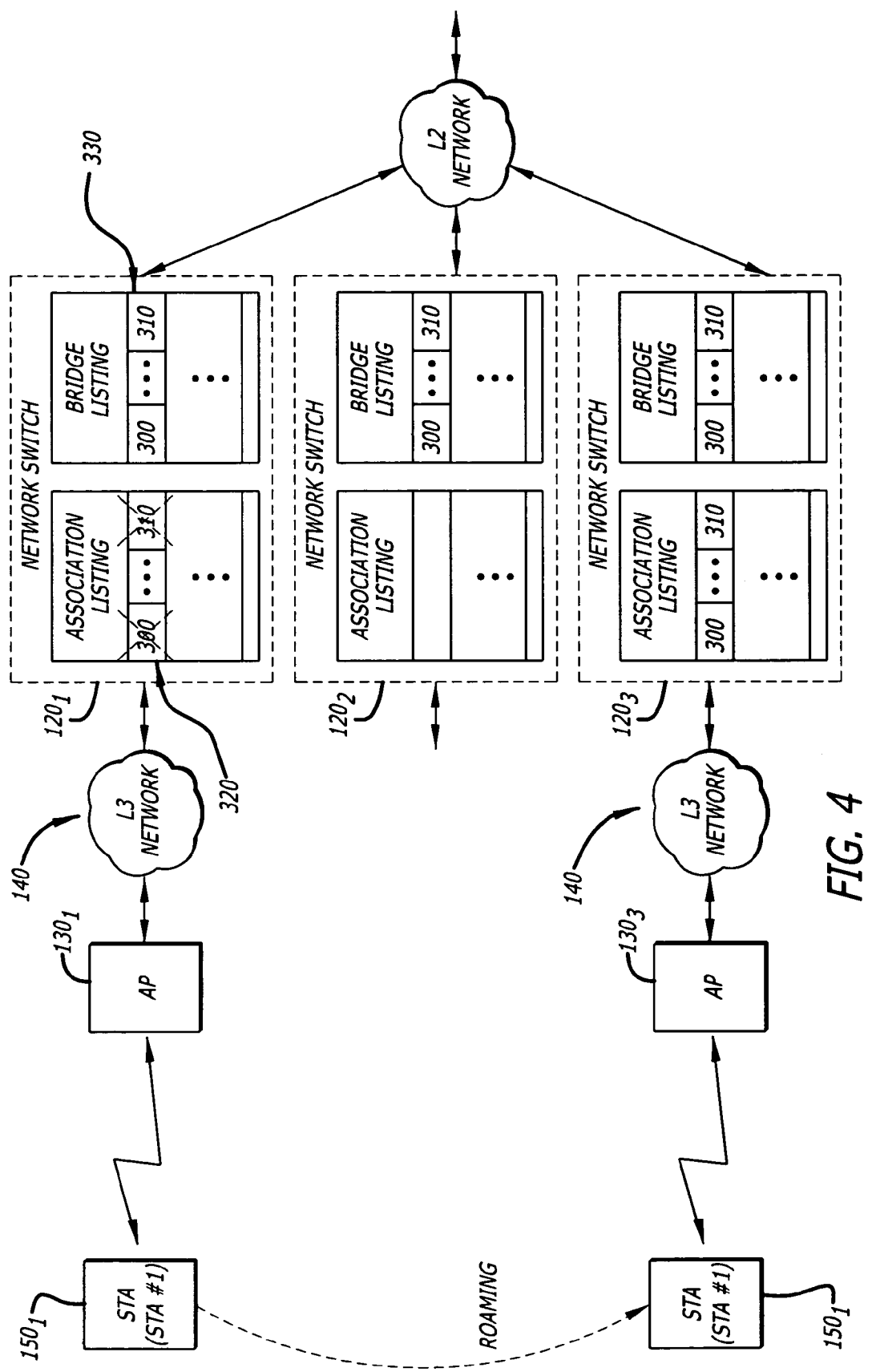
FIG. 4 is an illustrative embodiment of the operations of a network device to formulate its Association and Bridge listings.

Referring to FIG. 4, an illustrative embodiment of the operations of a network device to formulate its Association and Bridge listings are described below. Upon STA $150_1$ associating with AP $130_1$ that is terminated by network switch $120_1$, network device $120_1$ extracts a MAC address of STA $150_1$, namely STA MAC address 300, from the incoming message and determines if STA MAC address 300 has been previously stored within an Association listing $230_1$ stored by network device $120_1$.

Where processing logic 200 determines that extracted STA MAC address 300 has not been previously stored within Association listing $230_1$ Association listing $230_1$ is updated by assigning STA $150_1$ to a selected identifier (e.g., VLAN ID 310) and creating a new entry 320 with STA MAC address 300 and VLAN identifier 310 identifying the selected VLAN.

In addition, a new entry 330 is created within Bridge listing 250 of network device $120_1$. Entry 330 comprises STA MAC address 300 and VLAN identifier 310. In response to creation of a new entry within Bridge listing 250, it is contemplated that Bridge listings for network switch $120_2$ and $120_3$, namely Bridge listings 260 and 270, are populated with information contained in entry 330. As a result, each network switch $120_1$-$120_3$ includes duplicative entries for STA MAC address 300 and VLAN identifier 310 found in Bridge listings 250, 260 and 270. The entries of Bridge listings 250, 260 and 270 are populated as described above.

As a result, in the event that STA $150_1$ now associates with AP $130_3$, in lieu of reassigning VLAN or performing IP-to-IP tunneling, network switch $120_3$ first determines whether information for STA $150_1$ is in Association listing $230_3$ stored therein. Since this involves a new association between STA $150_1$ and AP $130_3$, no corresponding entry would be located in Association listing $230_3$. As a result, Bridge listing 270 is reviewed to determine whether STA MAC address 300 (for STA $150_1$) is contained therein. Since STA $150_1$ was previously associated with AP $130_1$, Bridge listing 270 would feature the entry, and thus, would assign any multicast or broadcast messages from STA $150_1$ to the VLAN associated with VLAN identifier 310.

With respect to aging of the Association and Bridge listings, it is contemplated that entries within an Association listing are aged out (e.g., available to be overwritten) when the station associated with the entry disassociates from an Access Point terminated by the network switch. For instance, entry 320 associated with STA $150_1$ is aged out (represented by cross-out in dashed lines) when STA $150_1$ disassociated from APs $130_1$ and $130_2$. In contrast, entries within Bridge listing 250 are aged out substantially slower than the age-out time frame for Association listing $230_1$, and thus, would contain entry 330 for a substantially longer duration and perhaps even indefinitely for networks with a limited number of newly added stations.

IV. General Operational Flow For VLAN Mobility

Figure 5:
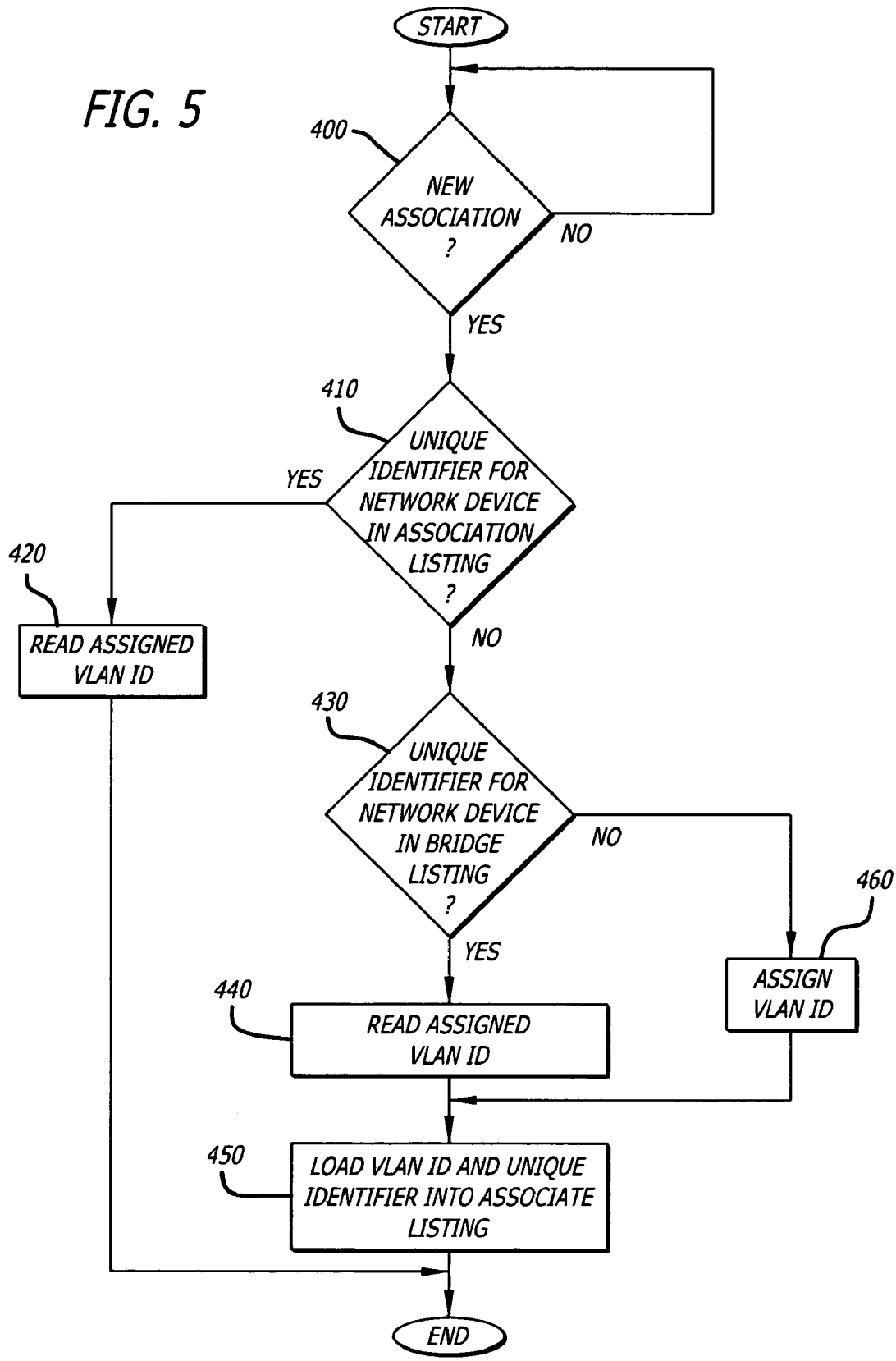
FIG. 5 is an exemplary embodiment of a method of operation for the network switch of FIG. 2 in supporting VLAN mobility.

Referring now to FIG. 5, an exemplary embodiment of a method of operation for the network switch of FIG. 2 in supporting VLAN mobility. Upon determining a new association by a network device, a determination is made whether the Association listing contains a unique identifier for the network device (blocks 400 and 410). The unique identifier may include a MAC address of the network device, such as a STA MAC address. If the Association listing contains a unique identifier for the network device, the VLAN identifier is read and used for multicast or broadcast messages (block 420).

However, if the Association listing does not contain a unique identifier for the network device, a determination is made whether the Bridge listing contains the unique identifier for the network device (block 430). If the Bridge listing contains a unique identifier for the network device, the VLAN identifier is read and used for multicast or broadcast messages (block 440). In addition, the contents of the entry is loaded into the Association listing (block 450). Otherwise, the VLAN identifier is assigned, causing a new entry to be created within the Association listing, the Bridge listing as well as Bridge listings of the other network switches (block 460).

V. VLAN Pooling

One or more of network switches $120_1$-$120_N$ of FIG. 1 may further be adapted to perform VLAN pooling operations based on information received from APs $130_1$-$130_M$ that originated from STAs $150_1$-$150_P$. For instance, network switch $120_1$, may be configured to assign each STA $150_1$, $150_2, \ldots,$ or $150_P$ to a particular VLAN in order to establish broadcast/multicast domains for STAs $150_1$-$150_P$. This assignment is conducted independent of the physical location of STA $150_1$, $150_2, \ldots,$ or $150_P$, but rather, is assigned to a selected VLAN based on the STA MAC address and the size of the VLAN pool as described below.

A. General Exemplary Embodiment

Figure 6A:
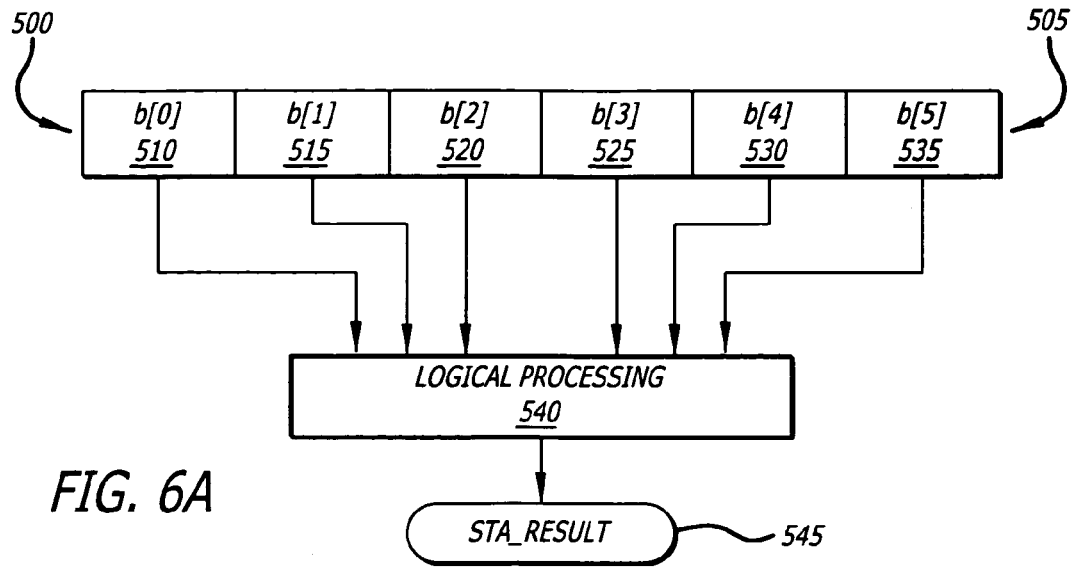
FIG. 6A is a general exemplary embodiment of a virtual local area network (VLAN) pooling that is conducted by a network device.

Referring now to FIG. 6A, a general exemplary embodiment of a virtual local area network (VLAN) pooling operation that is conducted by a network device (e.g., network switch $120_1$ of FIG. 2) is shown. The VLAN pooling operation is directed to assigning different network devices to a particular VLAN of a group of VLANs (VLAN pool), irrespective of its physical location and based in part on a unique identifier of the network device such as its MAC address.

Once an AP receives a message from a particular STA, such as an Association Request, information within the Association Request is routed to the network switch. Such information includes some or all of the information contained in a header of the incoming message. From this information, the unique identifier of the network device (e.g., STA MAC address 505) from the Association Request is extracted. As shown, STA MAC address 505 includes a plurality of bytes 500, such as bytes b[0] 510, b[1] 515, b[2] 520, b[3] 525, b[4] 530 and b[5] 535.

These bytes 500 undergo logical operations 540 that are performed on a bitwise or multi-bit basis (e.g., nibble, byte, word, double word, etc.). As an example, XOR operations may be performed on STA MAC address 505 on a byte-wise basis as set forth in FIG. 6A described below. The result of these XOR operations produces a result (referred to as "STA_Result") 545.

According to one embodiment of the invention, logical operations are performed on STA MAC address 505, such as byte-wise XOR operations on successive bytes of STA MAC address 505. More specifically, byte b[0] 510 is XOR'ed with byte b[1] 515 to produce a first intermediate result. The first intermediate result is XOR'ed with byte b[2] 520 to produce a second intermediate result. Similarly, byte b[3] 525 is XOR'ed with the second intermediate result to produce a third intermediate result, byte b[4] 530 is XOR'ed with the third intermediate result to produce a fourth intermediate result, and byte b[5] 535 is XOR'ed with the fourth intermediate result to produce a result value (STA_Result) 540.

As yet another example, although not shown, XOR operations may be performed on successive nibbles (4-bit segments) forming STA MAC address 505 to produce STA_Result 545. For instance, a first nibble of byte b[0] 510 is XOR'ed with a second nibble of byte b[0] 510. The XOR result is XOR'ed with a first nibble of byte b[1] 515, which is then XOR'ed with a second nibble of byte b[1] 515. This successive logical process continues until the second nibble of byte b[5] 535 is XOR'ed with the prior computed XOR result associated with nibbles forming bytes b[0] 510 through b[4] 530 and a first nibble of byte b[5] 535.

Figure 6B:
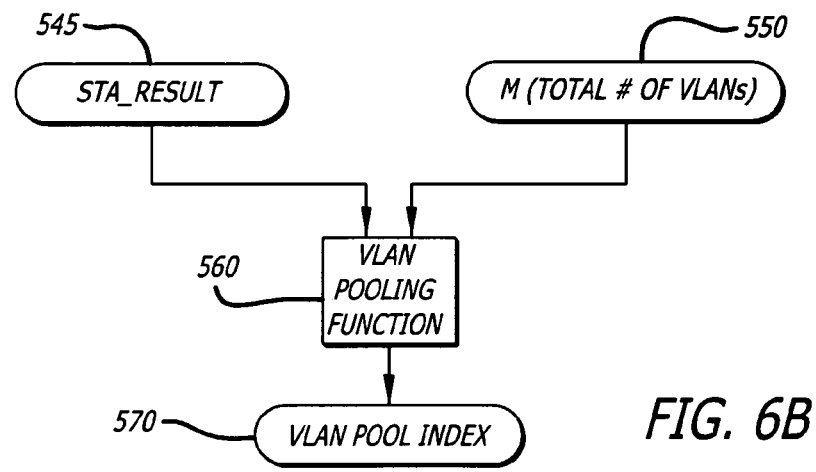
FIG. 6B is a general exemplary embodiment of an operation to produce a VLAN pool index used for VLAN assignment.

Referring now to FIG. 6B, a general exemplary embodiment of an operation performed by network device (e.g., network switch $120_1$) to produce a VLAN pool index 570 used for VLAN assignment is shown. One or more arithmetic operations 560 are performed on the STA_Result 545 and a value 550, representing the total number "M" (M≧1) of VLANs forming a VLAN pool. An example of an arithmetic operation includes, but is not limited or restricted to a Modulo (MOD) operation as set forth in equation (1) below.

$$\text{VLAN Pool Index} = \text{STA\_Result MOD } M \tag{1}$$

Figure 6C:
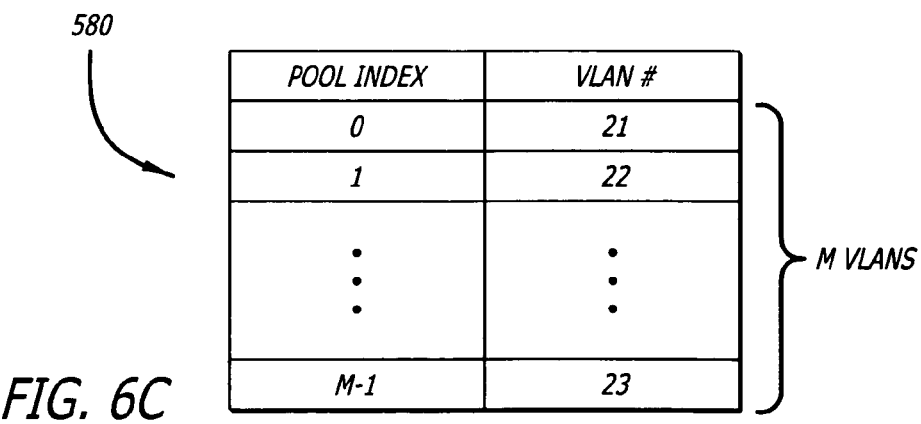
FIG. 6C is an exemplary embodiment of a VLAN Assignment table.

As shown, the arithmetic operation(s) 560 are adapted to produce VLAN Pool Index 570, which is equivalent to a remainder of STA_Result 545 divided by a total number of VLANs 550 according to this embodiment of the invention. Given that there are "M" VLANs in total, VLAN Pool Index 570 can range from "1" to "M−1". Hence, each potential value for VLAN Pool Index 570 uniquely corresponds to a VLAN from the VLAN pool, which is stored within a VLAN Assignment table 580 set forth in FIG. 6C.

VLAN Assignment table 580 is used by the network device to route all incoming multicast and broadcast messages from a particular station to other network devices within its VLAN. Also, table 580 may be used for unicast messages from the station such as when the message is an Ethernet message (i.e., VLAN identifier may be included in the Ethernet header).

Figure 6D:
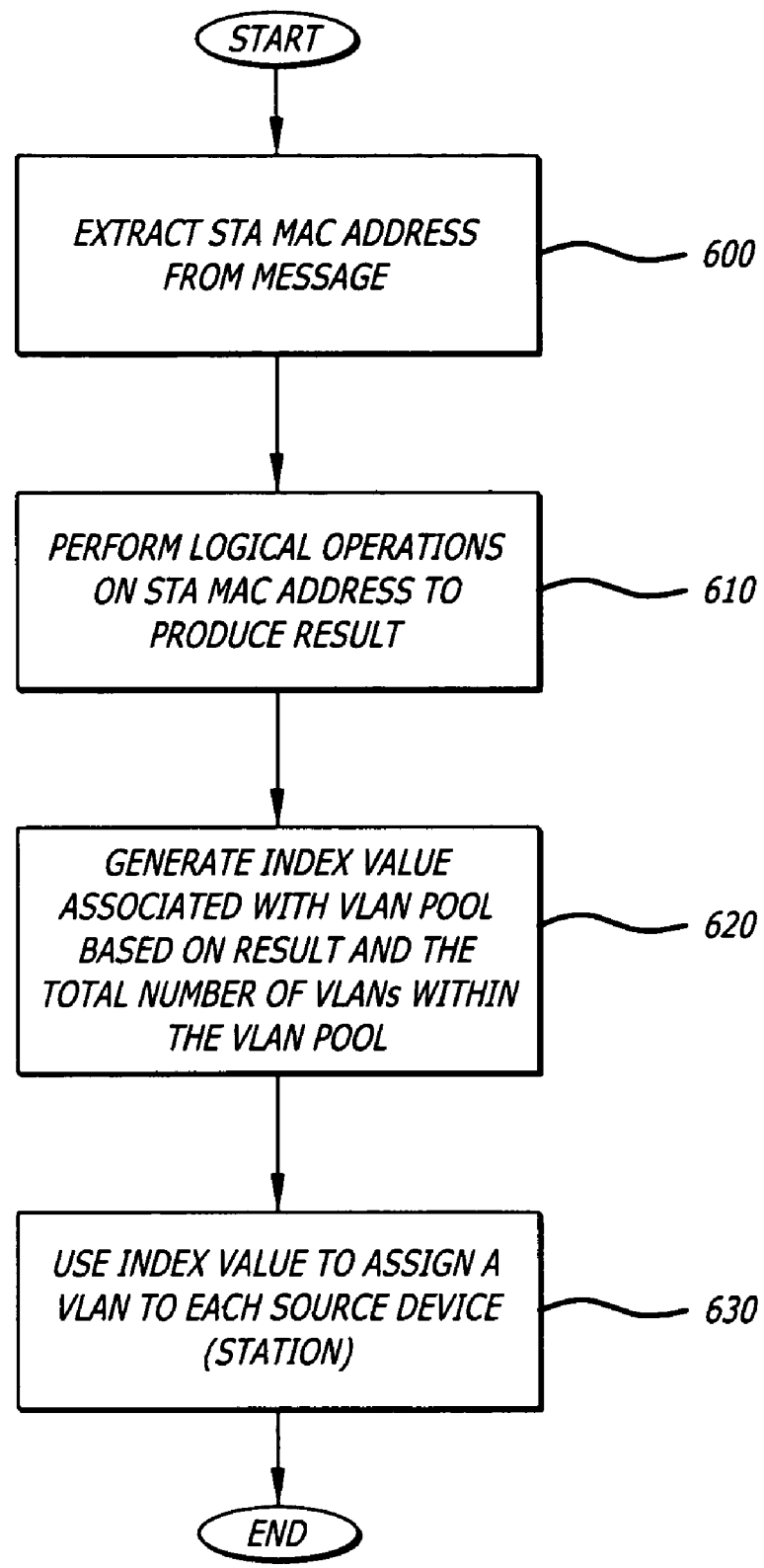
FIG. 6D is an exemplary embodiment of a method of operation for VLAN pooling.

Referring now to FIG. 6D, an exemplary embodiment of a method of operation for VLAN pooling is shown. First, upon receipt of information contained in wireless message from a station (STA), such as an Association Request for example, the unique identifier (e.g., STA MAC address) is extracted (block 600). Logical operations are performed on the STA MAC address to produce a result (block 610). According to one embodiment of the invention, the result is produced by conducting XOR operations on successive bytes and prior XOR computations (e.g., b[0] XOR b[1] XOR b[2] XOR b[3] XOR b[4] XOR b[5]). However, other types of logical operations may be performed on the STA MAC address to produce the result.

After the result is produced, as shown in block 620, arithmetic operations are conducted on the result and the total number of VLANs within a VLAN pool established for the network in order to generate an index (VLAN Pool Index). As an illustrated example described above, the arithmetic operation may be a "Modulo" operation where each possible remainder is uniquely assigned to a particular VLAN of the VLAN pool. However, it is contemplated that other arithmetic operations may be performed.

The index is associated with the particular VLAN for assigning the STA to that VLAN. Hence, upon subsequent reception of a message for multicast or broadcast transmission from the STA, this VLAN information is used to complete such transmissions to other network devices within the STA's VLAN (block 630). Moreover, the VLAN information may be used for unicast transmissions and the insertion of the VLAN identifier into the header of the outgoing message originating from the STA.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method for supporting and maintaining virtual local area networks of a network based on internal operations within a network switch, comprising:

initiating communications between a first network device and a second network device by the network switch;

determining whether a media access control (MAC) address unique identifier of the second network device is within an Association listing, the Association listing being stored within a memory implemented within the network switch and including source MAC addresses unique identifiers of networks devices associated with the first network device and virtual local area network (VLAN) identifiers for the network devices associated with the first network device;

determining if the source MAC address unique identifier of the second network device is within a Bridge listing if the source MAC address unique identifier of the second network device is not located within the Association listing, the Bridge listing being stored within the memory implemented within the network switch; and reading a VLAN identifier assigned to the second network device from the Bridge listing for use in a multicast or broadcast transmission from the network switch to network devices assigned to a virtual local area network represented by the VLAN identifier if the source MAC address unique identifier of the second network device is located within the Bridge listing.

2. The method of claim 1, wherein the Bridge listing is a table stored in the memory of the network switch and includes source MAC addresses unique identifiers of a plurality of networks devices forming the network and VLAN identifiers for the plurality of networks devices.

3. The method of claim 1 further comprising:

assigning a VLAN identifier to the second network device by the network switch if the source MAC address unique identifier of the second network device is not located within the Bridge listing.

4. The method of claim 1, wherein prior to determining if the source MAC address unique identifier of the second network device is within the Bridge listing, the method further comprising:

reading the VLAN identifier assigned to the second network device from the Association listing if the source MAC address unique identifier is within the Association listing, the reading being conducted by logic within the network switch.

5. The method of claim 1 further comprising:

loading the VLAN identifier and the source MAC address unique identifier of the second network device into the Association listing.

6. The method of claim 5 being conducted by a management server in communication with the first network device.

7. The method of claim 6 further comprising:

loading the VLAN identifier and the source MAC address unique identifier of the second network device into a Bridge listing of at least the second network device in communication with the first network device.

8. The method of claim 1, wherein prior to determining whether the source MAC address unique identifier of the second network device is within the Association listing, the method further comprising:

determining if the communications constitute a new association.

9. A network switch comprising:

a first unit to extract a source media access control (MAC) address from an incoming message from a station and determines whether the source MAC address is within an Association listing, the Association listing includes source MAC addresses of networks devices associated with the network switch and virtual local area network (VLAN) identifiers for the network devices associated with the network switch;

a second unit to determine without accessing sources remote to the network switch if the source MAC address of the station is within a Bridge listing if the source MAC address of the station is not stored within the Association listing; and a third unit to read a VLAN identifier assigned to the station from the Bridge listing for use in a multicast or broadcast transmission to network devices assigned to a VLAN represented by the VLAN identifier if the source MAC address of the station is stored within the Bridge listing.

10. The network switch of claim 9, wherein the third unit further assigns a VLAN identifier to the station if the source MAC address of the station is not stored within the Bridge listing.

11. The network switch of claim 9, wherein the first unit further reads the VLAN identifier assigned to the station from the Association listing if the unique identifier is stored within the Association listing.

12. The network switch of claim 9 further comprising:

a fourth unit to copy the VLAN identifier and the source MAC address of the station stored within the Bridge listing into the Association listing.

13. The network switch of claim 12, wherein the fourth unit further loads the VLAN identifier and the source MAC of the station into a Bridge listing of at least a second network switch of the network in communication with the network switch.

14. A network switch comprising:

a memory to store an Association listing and a Bridge listing; and processing logic to (i) determine, without accessing sources remote to the network switch, if a source MAC address for a network device transmitting a message to the network switch is contained within the Association listing or is contained within the Bridge listing if the source MAC address is not contained within the Association listing, and (ii) produce a message for transmission using a virtual local area network (VLAN) identifier corresponding to the source MAC address upon location of the source MAC address within one of the Association listing and the Bridge listing.

15. The network switch of claim 14 further comprising:

logic for establishing communications with the network device over an interconnect.

16. The network switch of claim 15, wherein the network device is a wireless station.

17. The network switch of claim 14, wherein the VLAN identifier is computed and assigned to correspond with the source MAC address of the network device based on a logical operation performed on the source MAC address to produce a result and an arithmetic operation performed on the result and a total number of virtual local area networks supported by a network implemented with the network switch.

18. A network switch, comprising:
a memory to store an Association listing and a Bridge listing; and
processing logic to (i) determine, without accessing sources remote to the network switch, if a source MAC address for a network device transmitting a message to the network switch is contained within the Association listing or is contained within the Bridge listing if the source MAC address is not contained within the Association listing, and (ii) produce a message for transmission using a virtual local area network (VLAN) identifier corresponding to the source MAC address upon location of the source MAC address within one of the Association listing and the Bridge listing,
wherein the VLAN identifier is computed and assigned to correspond with the source MAC address of the network device based on a logical operation performed on the source MAC address to produce a result and an arithmetic operation performed on the result and a total number of virtual local area networks supported by a network implemented with the network switch, and
wherein the logical operation on the source MAC address includes separating the source MAC address into a plurality of bit segments with each bit segment being at least one bit in length, and performing Exclusive OR (XOR) operations on the plurality of bit segments in succession to produce the result.

19. A network switch, comprising:
a memory to store an Association listing and a Bridge listing; and
processing logic to (i) determine, without accessing sources remote to the network switch, if a source MAC address for a network device transmitting a message to the network switch is contained within the Association listing or is contained within the Bridge listing if the source MAC address is not contained within the Association listing, and (ii) produce a message for transmission using a virtual local area network (VLAN) identifier corresponding to the source MAC address upon location of the source MAC address within one of the Association listing and the Bridge listing,
wherein the VLAN identifier is computed and assigned to correspond with the source MAC address of the network device based on a logical operation performed on the source MAC address to produce a result and an arithmetic operation performed on the result and a total number of virtual local area networks supported by a network implemented with the network switch, and
wherein the arithmetic operation includes a Modulo operation on the result and the total number of virtual local area networks to generate the VLAN identifier.

* * * * *